US008949512B2

(12) United States Patent
Vogan et al.

(10) Patent No.: US 8,949,512 B2
(45) Date of Patent: Feb. 3, 2015

(54) TRIM TOKEN JOURNALING (75) Inventors: Andrew W. Vogan, Portland, OR (US); Matthew J. Byom, San Jose, CA (US); Daniel J. Post, Campbell, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 13/399,818

(22) Filed: Feb. 17, 2012

(65) Prior Publication Data
US 2013/0219106 A1    Aug. 22, 2013

(51) Int. Cl.
G06F 12/02 (2006.01)
G06F 9/44 (2006.01)

(52) U.S. Cl.
CPC .... G06F 12/0246 (2013.01); *G06F 2212/7201* (2013.01); *G06F 9/4401* (2013.01)
USPC ................................ 711/103; 711/206; 713/2

(58) Field of Classification Search
CPC .............. G06F 12/0246; G06F 3/0679; G06F 2212/2022; G06F 2212/7211; G06F 9/4401; G06F 2212/1008; G06F 2212/7201; G11C 16/102
USPC ....................................... 711/103, 206; 713/2
See application file for complete search history.

(56) References Cited

U.S. PATENT DOCUMENTS

| 5,860,083 A | 1/1999 | Sukegawa |
| 2007/0106853 A1 | 5/2007 | Evanchik et al. |
| 2008/0140910 A1* | 6/2008 | Flynn et al. ................... 711/100 |
| 2008/0263305 A1 | 10/2008 | Shu et al. |
| 2008/0307158 A1 | 12/2008 | Sinclair |
| 2009/0164715 A1 | 6/2009 | Astigarraga et al. |
| 2009/0271562 A1* | 10/2009 | Sinclair .......................... 711/103 |
| 2010/0125714 A1* | 5/2010 | Mehra et al. .................. 711/166 |
| 2010/0217927 A1* | 8/2010 | Song et al. .................... 711/103 |
| 2011/0072199 A1* | 3/2011 | Reiter et al. .................. 711/103 |
| 2011/0145306 A1 | 6/2011 | Boyd et al. |
| 2011/0208898 A1* | 8/2011 | Shin .............................. 711/103 |
| 2011/0271037 A1 | 11/2011 | Oh et al. |
| 2012/0054465 A1 | 3/2012 | Post et al. |

OTHER PUBLICATIONS

U.S. Appl. No. 13/235,019, filed Sep. 15, 2011.

* cited by examiner

*Primary Examiner* — Charles Rones
*Assistant Examiner* — Andrew Russell
(74) *Attorney, Agent, or Firm* — Van Court & Aldridge LLP (57) ABSTRACT

Systems and methods are disclosed for trim token journaling. A device can monitor the order in which trim commands and write commands are applied to an indirection system stored in a volatile memory of the device. In some embodiments, the device can directly write to a page of an NVM with a trim token that indicates that a LBA range stored in the page has been trimmed. In other embodiments, a device can add pending trim commands to a trim buffer stored in the volatile memory. Then, when the trim buffer reaches a pre-determined threshold or a particular trigger is detected, trim tokens associated with all of the trim commands stored in the trim buffer can be written to the NVM. Using these approaches, the same sequence of events that was applied to the indirection system during run-time can be applied during device boot-up.

15 Claims, 9 Drawing Sheets

TRIM TOKEN JOURNALING

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

A device having an NVM can sometimes store an indirection system in volatile memory. The indirection system can be a data structure that maps a logical space to a physical space. In some cases, the indirection system may have a trim (e.g., "unmap") functionality allowing one or more entries of the indirection system to be unmapped when corresponding data is unmapped. Unfortunately, if the amount of memory that has been allocated for the indirection system prevents the indirection system from expressing a worst case physical fragmentation of the logical space, the device may not boot properly after an ill-timed reset.

SUMMARY OF THE DISCLOSURE

Systems and methods are disclosed for trim token journaling. During device run-time, a device can monitor the order in which trim commands (e.g., unmap commands) and write commands are applied to an indirection system stored in a volatile memory of the device. In some embodiments, the device can directly write to a page of a non-volatile memory ("NVM") with a trim token that indicates that a LBA range stored in the page has been trimmed. In other embodiments, a device can add pending trim commands to a trim buffer stored in the volatile memory. When the trim buffer reaches a pre-determined threshold or a particular trigger is detected, trim tokens associated with the trim commands stored in the trim buffer can be written to the NVM. Thus, during run-time, by recording (e.g., buffering) trim commands in the NVM in the order that they were applied with respect to write commands, the same sequence of events (e.g., trim commands and write commands) can be applied to the indirection system during device boot-up.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for trim token journaling are provided. A non-volatile memory ("NVM") interface of a device can monitor the order in which trim commands (e.g., unmap commands) and write commands are applied to an indirection system. As used herein, an indirection system can be a structure stored in a volatile memory of the device that provides a mapping between logical block addresses ("LBAs") and corresponding physical addresses of the NVM.

In some embodiments, each time that a trim command associated with a LBA range is received during device run-time, the NVM interface can directly write to a page of the NVM with a trim token indicating that the LBA range has been trimmed. In other embodiments, the NVM interface can add pending trim commands to a trim buffer stored in the volatile memory. Then, when the trim buffer reaches a predetermined threshold or a particular trigger is detected, trim tokens associated with the trim commands stored in the trim buffer can be written to the NVM.

Subsequently, upon device boot-up, the NVM interface can rebuild at least a portion of the indirection system based at least in part on the stored trim tokens. In particular, if the NVM interface determines that a page of the NVM includes a trim token, the NVM interface can extract page contents and read one or more LBA ranges from the page. The NVM interface can then apply trim values to portion(s) of the indirection system associated with the one or more LBA range(s). As a result, the same sequence of events (e.g., trim commands and user data writes) that was applied to the indirection system during run-time can be applied during device boot-up.

Figure 1:
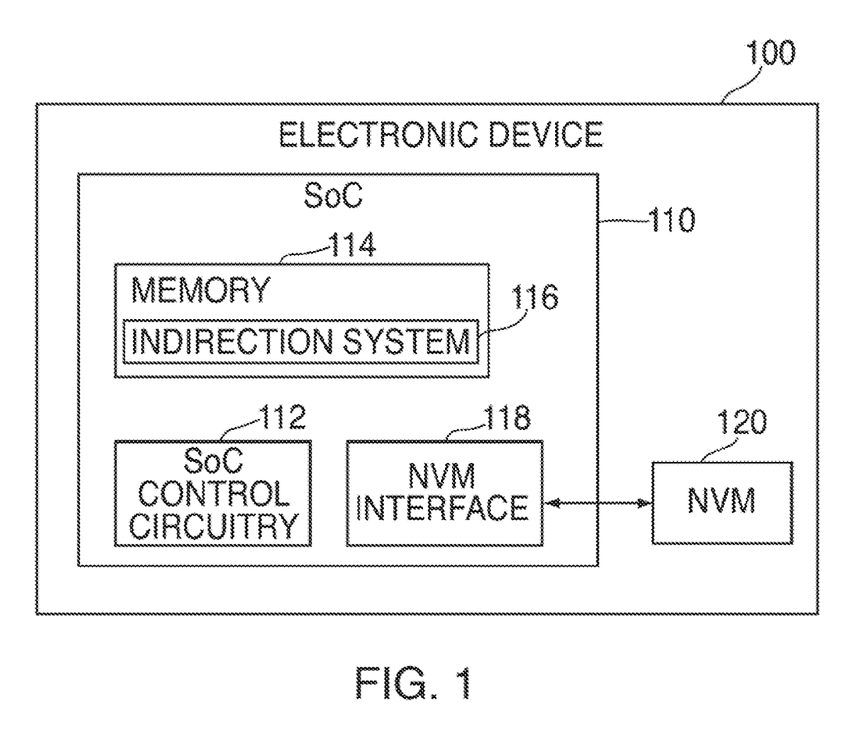
FIGS. 1 and 2 are block diagrams of electronic devices configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which can the smallest erasable unit, and further organized into "pages", which can be the smallest unit that can be programmed or read. In some embodiments, NVM 120 can include multiple integrated circuits, where each integrated circuit may have multiple blocks. Memory locations (e.g., blocks or pages of blocks) from corresponding integrated circuits may form "super blocks". Each memory location (e.g., page or block) of NVM 120 can be referenced using a physical address (e.g., a physical page address, physical block address, or virtual block address).

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

In some embodiments, memory 114 can store indirection system 116, which can be any suitable data structure for providing logical-to-physical mappings between logical addresses used by a file system and physical addresses of NVM 120. In particular, indirection system 116 can provide a mapping between logical block addresses ("LBAs") and corresponding physical addresses (e.g., physical page addresses or virtual block addresses) of NVM 120. In some embodiments, indirection system 116 can be a tree that is capable of storing the logical-to-physical mappings in a compressed form. In other embodiments, indirection system 116 can be a lookup table or mapping table.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write requests from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or Secure Digital ("SD") card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write requests to the target device.

Figure 2:
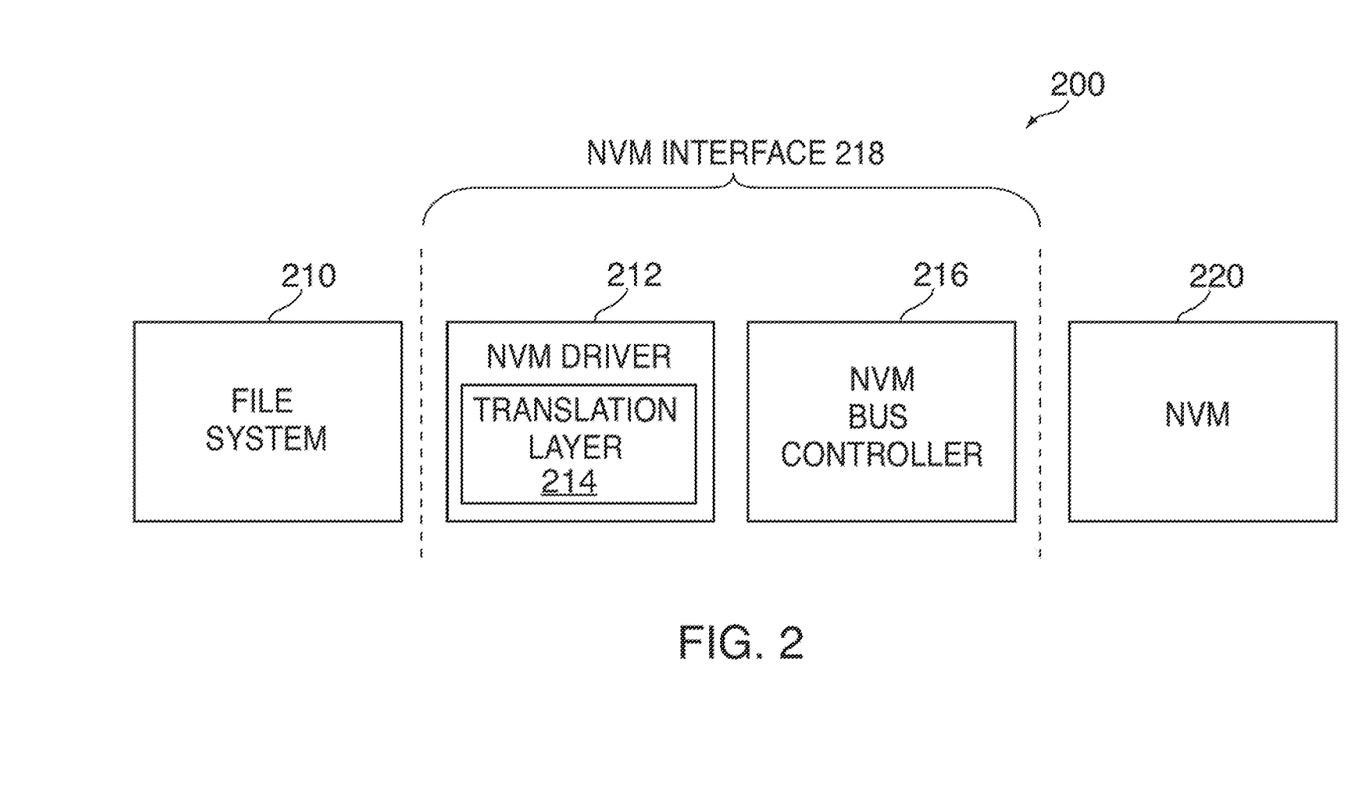

FIG. 2 illustrates a block diagram of electronic device 200, which may illustrate in greater detail some of the firmware, software, and/or hardware components of electronic device 100 (FIG. 1) in accordance with various embodiments. Electronic device 200 may have any of the features and functionalities described above in connection with FIG. 1, and vice versa. As shown, dashed lines demarcate the layers. It is understood that the depiction of which components fall within the demarcation lines are merely illustrative and that one or more components can be affiliated with a different layer.

Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system or a Hierarchical File System Plus ("HFS+"), and may be part of the operating system of electronic device 200 (e.g., part of SoC control circuitry 112 of FIG. 1). In some embodiments, file system 210 may include a flash file system, which provides a logical-to-physical mapping of pages. In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address ("LBA") with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write command, translation layer 214 can map the provided logical address to a free, erased physical location on NVM 220. On a read command, translation layer 214 can use the provided logical address to determine the physical address at which the requested data is stored. Because each NVM may have a different layout depending on the size or vendor of the NVM, this mapping operation may be memory and/or vendor-specific. Translation layer 214 can perform any other suitable functions in addition to logical-to-physical address mapping. For example, translation layer 214 can perform any of the other functions that may be typical of flash translation layers, such as garbage collection and wear leveling.

NVM driver 212 may interface with NVM bus controller 216 to complete NVM access commands (e.g., program, read, and erase commands). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata". The metadata may be generated by NVM driver 212 or may be generated by a module operating under the control of NVM driver 212. For example, metadata can include information used for managing the mapping between logical and physical addresses, information associated with bad block management, information associated with wear leveling, error-correcting code ("ECC") data used for detecting or correcting data errors, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if a separate data structure maintaining the physical-to-logical mapping in NVM 220 (e.g., context information stored in NVM 220) becomes outdated, NVM interface 218 may still determine the proper mapping at power-up or reboot of electronic device 200, for example.

As discussed above, a volatile memory of a device (e.g., memory 114 of FIG. 1) can include an indirection system (e.g., indirection system 116 of FIG. 1), which can store logical-to-physical mappings. The indirection system may sometimes need to express more physical fragments than the total amount of available memory would allow. This may occur, for example, when logical sectors are randomly programmed in an NVM or when logical sectors are programmed in a backwards order in the logical space. If context information stored in the NVM does not encompass trim commands that the device received in the recent past, the indirection system's memory demand may exceed supply. Consequently, an ill-timed device reset can cause subsequent boot-ups to run out of indirection memory, resulting in system hangs or repetitive resets. As used herein, "context information" can include information associated with the state of the NVM at a particular point in time such as, for example, self-identifying information, statistics information, one or more weave sequences (e.g., a base or start weave sequence and/or an end weave sequence), logical-to-physical mappings, self-identifying information (e.g., page type, version, and length), and/or any combination thereof. A weave sequence can indicate when data was last programmed to a LBA. In some embodiments, context information can also include trim information received prior to a particular point in time.

Figure 3:
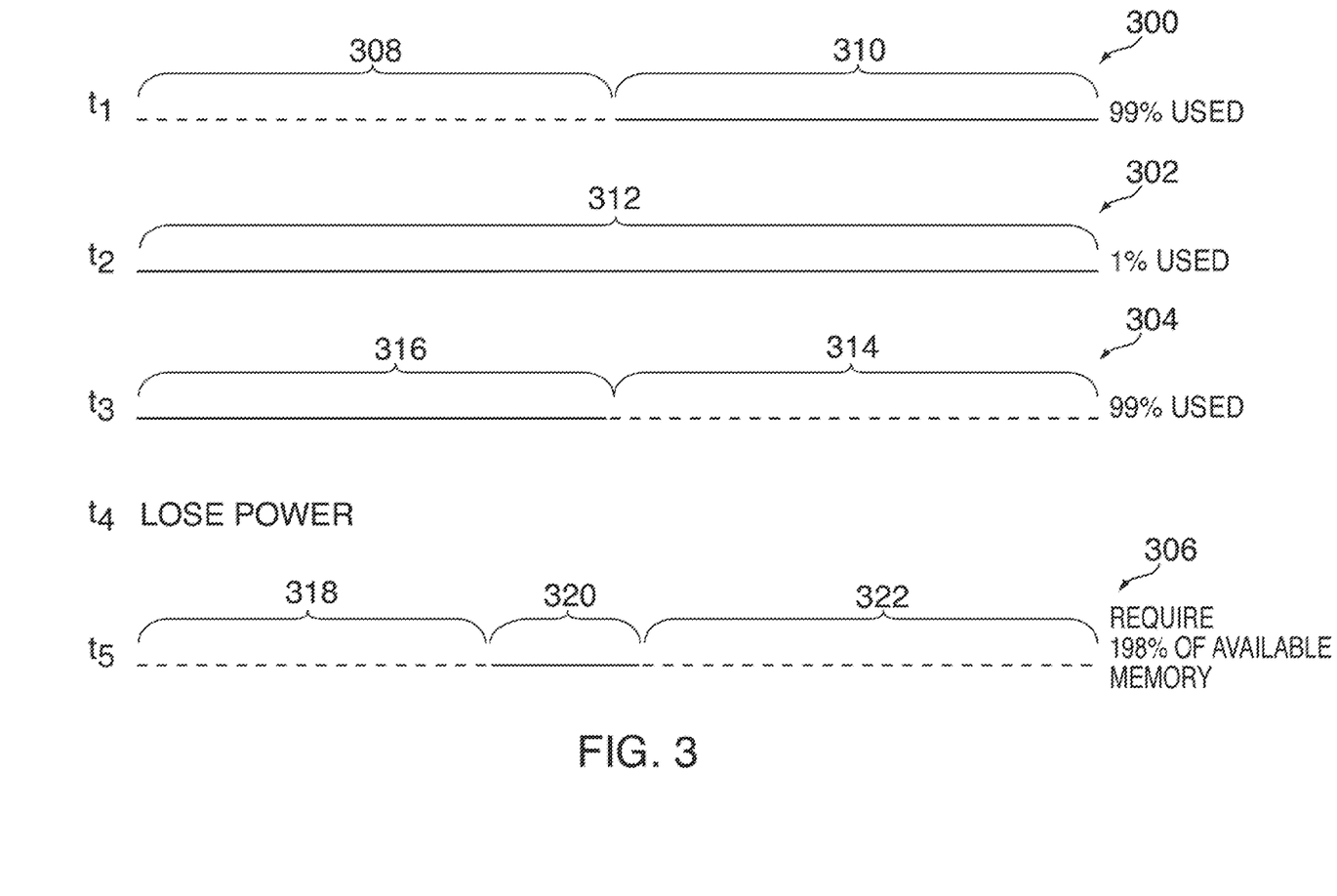
FIG. 3 is a graphical view of states of an indirection system in accordance with various embodiments of the invention.

For example, referring now to FIG. 3, an illustrative graphical view of states 300-306 of an indirection system (e.g., indirection system 116 of FIG. 1) is shown. States 300-306 may occur over a period of time (e.g., from $t_1$ to $t_5$).

Each of states 300-306 may describe physical fragments over a logical space, and the horizontal lines associated with each state can represent the number and locality of the physical fragments. For example, at $t_1$, state 300 can include first portion 308 having short physical fragments, followed by second portion 310 having a long physical fragment. In the indirection system itself, short physical fragments can correspond to multiple small entries, while a long physical fragment can correspond to a single large entry.

The physical fragmentation of first portion 308 may occur for a number of reasons. For example, file(s) having LBAs in first portion 308 may have been randomly written, written at different times, and/or updated in the middle of their corresponding LBA ranges. Thus, although the LBAs are adjacent in logical space, user data associated with the LBAs have been stored at different memory locations on the NVM. File (s) having LBA ranges in first portion 308 may be, for example, one or more randomly written database files or one or more benchmark output files that are only associated with first portion 308.

As a result of the physical fragmentation, the indirection system's memory usage may be nearly full at $t_1$ (e.g., 99% of the total available memory of the indirection system is being used). In some cases, a device (e.g., electronic device 100 of FIG. 1 or electronic device 200 of FIG. 2) can monitor a variable indicating the amount of memory that is currently available for the indirection system. In some cases, if the amount of memory falls below a pre-determined threshold, the device can attempt to reduce the number of physical fragments in order to free up at least a portion of the indirection system's memory (e.g., by applying a tree flattening algorithm).

At $t_2$, first portion 308 may be trimmed. Consequently, LBAs of first portion 308 may have unmapped states. For example, the one or more database files or benchmark output files may be deleted. As a result, state 302 can include only portion 312. In the indirection system, the multiple small entries associated with first portion 308 can be replaced by one large entry.

Because of the trimming, a large portion of the indirection system's memory is freed up, and the memory usage may fall to a low level (e.g., only 1% of the total available memory of the indirection system is now being used). Thus, the number of physical fragments no longer has to be reduced in order to free up the indirection system's memory.

The trimming of first portion 308, however, is expressed in the volatile memory only (e.g., in the indirection system). That is, unlike data writes (e.g., writes resulting from user data write commands, a tree flattening algorithm, or garbage collection), trim commands are not automatically stored on the NVM when they are received.

At $t_3$, the device may write to a different portion of the logical space (e.g., a different LBA range). In particular, state 304 can include first portion 314 having short physical fragments, and second portion 316 having a long physical fragment. The physical fragmentation of first portion 314 may occur because the device wrote one or more new database files or benchmark output files having LBAs in first portion 314. Consequently, the indirection system's memory usage may become nearly full again (e.g., 99% of the total available memory of the indirection system is being used).

Then, at $t_4$, the device may lose power. This may occur for a number of reasons such as, for example, due to an abnormal event or when the device battery is drained before a clean shutdown. Assuming that a context save has not been performed since $t_2$, state 306 may result at $t_5$ when the device boots up. As used herein, a "context save" can refer to a system operation during which context information is saved to one or more blocks of the NVM.

Upon device boot-up, the device can first load context information from an NVM. The context information that is loaded can then be used to update the indirection system.

After updating the indirection system, the device can search for user data that was programmed after the context save. In particular, the device can obtain more recent logical-to-physical mapping updates from the NVM, and apply those updates to the indirection system.

However, assuming that context information has not been saved on the NVM since $t_2$, the device does not have a record of the trimming of first portion 308 at $t_2$. Consequently, state 306 may include first portion 318 (corresponding to first portion 308 of state 300), followed by second portion 320. Moreover, because information about the trimming of first portion 314 has also been lost during the power loss, state 306 can include third portion 322 (corresponding to first portion 314 of state 304).

Thus, in order for the device to rebuild the indirection system, first portion 318 and third portion 322 have to be enumerated simultaneously in the indirection system. Unfortunately, the simultaneous expression of first portion 318 and third portion 322 may consume more than the total amount of memory that is available for the indirection system (e.g., 198% of the of the total available memory of the indirection system). Consequently, while attempting to free up space in the indirection system, device operations may freeze (e.g., the device may reach a persistent panic state or device operations may run in an infinite loop).

Accordingly, in order to avoid a scenario in which an indirection system is unable to enumerate all of the user data stored on the NVM, a device can monitor the order in which trim commands (e.g., unmap commands) and write commands are applied to an indirection system. In one embodiment, the device can directly write to a page of an NVM with a token (e.g., a trim token), which indicates that a LBA range stored in the page has been trimmed.

Figure 4:
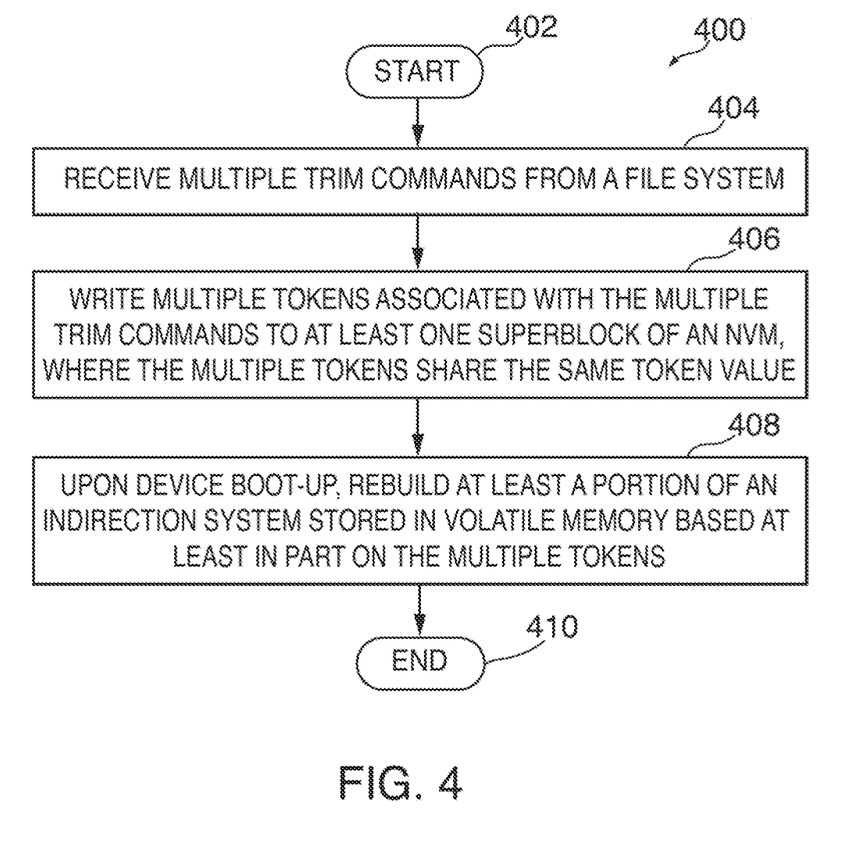
FIG. 4 is a flowchart of an illustrative process for storing trim tokens in a non-volatile memory in accordance with various embodiments of the invention.

For example, turning now to FIG. 4, a flowchart of an illustrative process 400 for storing trim tokens in an NVM (e.g., NVM 120 of FIG. 1 or NVM 220 of FIG. 2) is shown. Steps 404 and 406 of process 400 may occur during device run-time, while step 408 of process 400 can occur during device boot-up.

Process 400 may begin at step 402, and at step 404, an NVM interface (e.g., NVM interface 118 of FIG. 1 or NVM interface 218 of FIG. 2) can receive multiple trim commands from a file system (e.g., file system 210 of FIG. 2).

Then, at step 406, the NVM interface can write multiple tokens (e.g., trim tokens) associated with the multiple trim commands to at least one super block of an NVM, where the multiple tokens can share the same token value. In some cases, the token value may be equal to an invalid or large LBA number (e.g., a LBA number of 0xffff0001). The token value can be saved for use during a subsequent boot-up process.

The at least one super block may correspond to a currently active super block that is associated with a data stream (e.g., a static or dynamic data stream). Thus, upon receiving each trim command from the file system, the NVM interface can write a token associated with the trim command to a page of an active super block.

In some embodiments, in addition to writing multiple tokens, the NVM interface can write multiple LBA ranges to the at least one super block. That is, for each trim command, the NVM interface can write a LBA range that is associated with the trim command. The LBA range can include any suitable combination of values. For example, a LBA range can include a LBA start value and a LBA end value associated with logical sectors that are being unmapped by the trim command. As another example, a LBA range can include a LBA start value and a count of the number of logical sectors (e.g., the number of LBAs) that are being unmapped by the trim command.

At step 408, upon device boot-up, the NVM interface can rebuild at least a portion of an indirection system (e.g., indirection system 116 of FIG. 1) stored in volatile memory (e.g., memory 114 of FIG. 1) based at least in part on the multiple tokens. This can allow the NVM interface to unmap LBAs in the indirection system in the same sequence that the LBAs were previously unmapped during device run-time. As a result, once device boot-up has completed, the indirection system can have state 304 (FIG. 3) rather than state 306 (FIG. 3). Process 400 may then end at step 410.

The NVM interface can rebuild an indirection system using any suitable approach. For example, upon device boot-up, the device can load context information from the NVM in order to recover logical-to-physical mappings that existed when the context information was last stored. After recovering the logical-to-physical mappings, the NVM interface can modify the indirection system with the mappings.

Subsequently, the NVM interface can rebuild portions of the indirection system based on a combination of trim commands and user data writes that are stored on newly programmed super blocks of the NVM (e.g., super blocks that have been updated since the last context save). The NVM interface can determine these super blocks by comparing a weave sequence of the context information with an end weave sequence associated with each super block of the NVM (e.g., stored in a block table-of-contents ("TOC") of the super block). If an end weave sequence of a super block is greater (e.g., newer) than the weave sequence of the context information, the NVM interface can read the super block.

The newly programmed super blocks can be read in an order corresponding to their associated end weave sequences. That is, the NVM interface can begin with reading a super block with the minimum end weave sequence, and proceed to the other newly programmed super blocks in an order corresponding to increasing end weave sequences.

In addition, for each page of a super block, the NVM interface can determine if the page has been updated since the last context save (e.g. by comparing one or more weave sequences of the page with the weave sequence of the context information). If the NVM interface determines that the page has been updated since the last context save and does not include a token associated with a trim command, the NVM interface can obtain logical-to-physical mapping updates from the page. The NVM interface can then modify the indirection system (e.g., portions of the indirection system associated with the LBA ranges of the page) with the updates obtained from the page.

However, if the NVM interface determines that the page has been updated since the last context save and also includes a token associated with a trim command, the NVM interface can extract page contents and read a LBA range from the page. The token, which can correspond to the token that was written in step 406 of FIG. 4, can have a token value indicating that the page does not store user data, but rather includes a LBA range that has been trimmed. Subsequently, the NVM interface can apply a trim value to one or more portions of the indirection system associated with the LBA range. That is, the NVM interface can update one or more entries of the indirection system corresponding to the LBA range with an unmapped state. By making this determination for newly updated pages of the NVM, the same sequence of events (e.g., trim commands and user data writes) that was applied to the indirection system during run-time can be applied during device boot-up.

Such an approach, however, requires an NVM interface to write to a page of an NVM each time a trim command is received. Writing to a page of the NVM can increase write amplification, decrease system performance, and delay system operations. In particular, while a device is writing to a page associated with a trim command, other commands (e.g., write commands and read commands) need to be delayed. Moreover, space may be wasted in the NVM because only a small portion of a page is being used to store information associated with a trim command (e.g., a token and a LBA range). For example, a page may have a size of 4 KiB, 8 KiB, or 16 KiB. However, a token and a LBA range may only occupy a total size of 8 bytes. Consequently, a large portion of the page may be wasted.

Moreover, because there may be multiple processes that are simultaneously being executed on a device, the number of trim commands received from a file system can be substantial. This can further exacerbate the problems discussed above.

Thus, in alternative embodiments, instead of directly writing to a page of an NVM each time an incoming trim command is received, memory journaling can be used to establish time-coherency for trim commands. In particular, a device can store a list of pending trim commands in memory (e.g., memory 114 of FIG. 1). As used herein, "pending trim commands" can refer to trim commands that have been received from a file system, but have not yet been applied to an indirection system or buffered to an NVM.

In order to ensure that the same sequence of events is applied during device boot-up as during run-time, the application of trim commands may need to be atomic with respect to the processing of write commands. In other words, a device may need to apply trim commands to an indirection system and an NVM atomically without processing write commands in between these applications. This is because write commands can cause state changes in an indirection system. For example, if a trim command is applied to an indirection system immediately upon receipt but is not buffered to the NVM until a later time, the sequence of events that can be recovered during device boot-up may be different than the sequence of events applied during run-time. In particular, this can occur if one or more write commands are programmed to the NVM following the application of the trim command to the indirection system but before the buffering of the trim command to the NVM. In contrast, read commands, which do not cause state changes in the indirection system, can be interspersed between the application of trim commands to the indirection system and the NVM. Moreover, the order in which trim commands are applied to the indirection system and the NVM is inconsequential (e.g., trim commands can be applied to the indirection system before, after, or at the same time as when the trim commands are applied to the NVM).

In some embodiments, the list of pending trim commands can be stored in a trim buffer of the volatile memory. For example, when a trim command is received, the trim command can be added to the trim buffer. Then, when the trim buffer reaches a pre-determined threshold (e.g., all of the pages of the buffer have been written), trim tokens associated with all of the trim commands stored in the trim buffer can be written to the NVM. Because trim commands are saved in the buffer immediately upon receipt, the trim commands are not applied to the indirection system until their associated trim tokens are written to the NVM. This can allow the device to maintain time-order coherency.

The trim buffer can be configured to have any suitable size. For example, the trim buffer can be configured to store 4 KiB of data. If each entry of the trim buffer occupies 8 bytes, the trim buffer may be capable of storing 512 entries.

Figure 5:
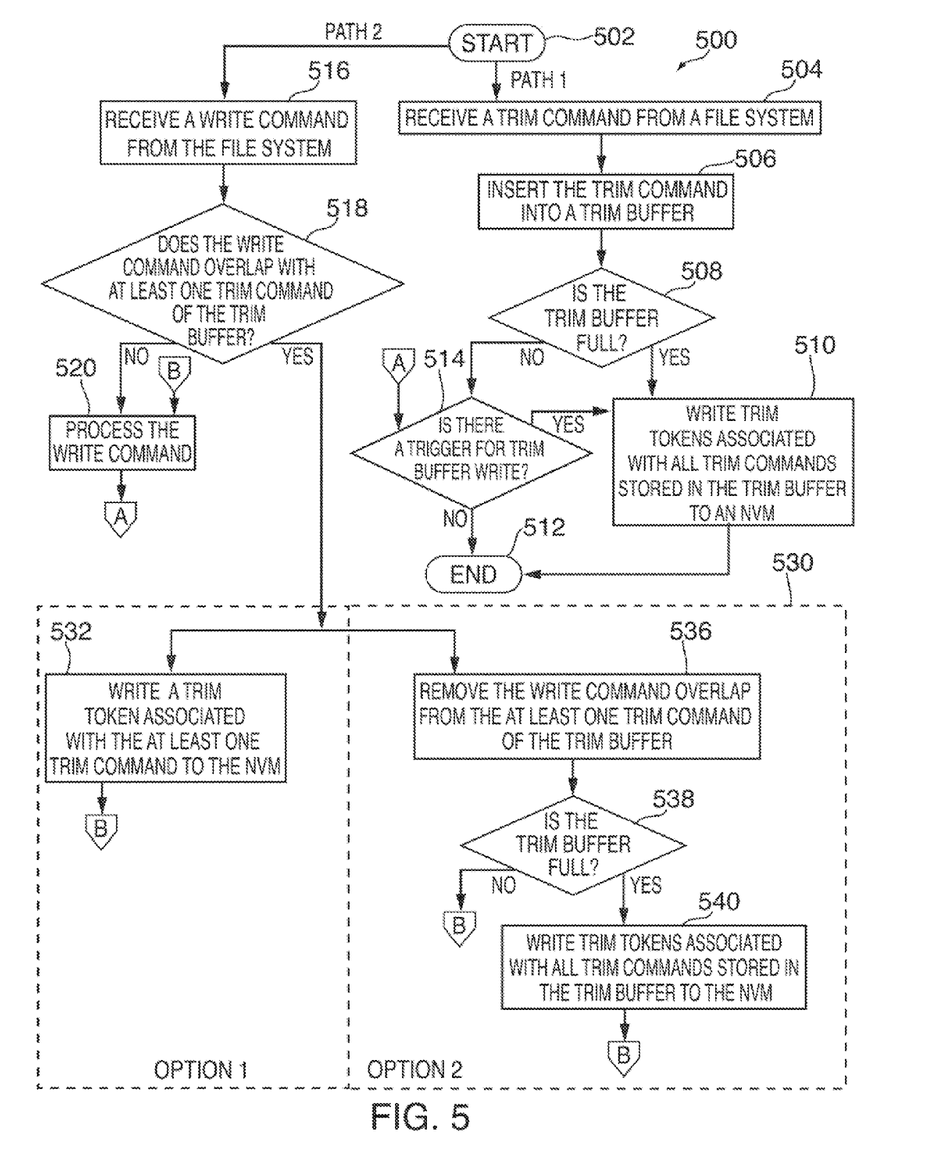
FIG. 5 is a flowchart of another illustrative process for storing trim tokens in a non-volatile memory in accordance with various embodiments of the invention.

Turning now to FIG. 5, a flowchart of another illustrative process 500 for storing trim tokens in an NVM (e.g., NVM 120 of FIG. 1 or NVM 220 of FIG. 2) is shown. Process 500 can occur during device run-time, and may begin at step 502. As indicated in FIG. 5, process 500 may be initiated in one of two ways: path 1 and path 2. Path 1 can correspond to a trim command path, whereas path 2 can correspond to a write command path. In some cases, the trim command path can be similar to a path for programming small write commands, where write commands are first saved in a buffer in volatile memory before being programmed to the NVM.

Path 1 may be initiated at step 504, where an NVM interface (e.g., NVM interface 118 of FIG. 1 or NVM interface 218 of FIG. 2) can receive a trim command from a file system (e.g., file system 210 of FIG. 2). At step 506, the NVM interface can insert the trim command into a trim buffer.

Continuing to step 508, the NVM interface can determine whether the trim buffer is full. If, at step 508, the NVM interface determines that the trim buffer is full, process 500 may move to step 510.

At step 510, the NVM interface can write trim tokens associated with all trim commands stored in the trim buffer to the NVM. Persons skilled in the art will appreciate that the NVM interface can also atomically apply the trim commands to an indirection system (e.g., indirection system 116 of FIG. 1). For the sake of simplicity, however, this step is omitted from FIG. 5. Process 500 may then end at step 512.

Referring back to step 508, if the NVM interface instead determines that the trim buffer is not full, process 500 may move to step 514. At step 514, the NVM interface can determine whether there is a trigger for trim buffer write. The trigger may cause the NVM interface to apply the trim commands stored in the trim buffer even if the trim buffer is only partially full (e.g., when the trim commands stored in the trim buffer occupies a sub-page rather than a full page). Any suitable trigger may cause this behavior such as, for example, one or more important system events (e.g., a flush command or a context save) or the detection that the indirection system's memory usage is above a pre-determined threshold (e.g., 99% memory usage). If the NVM interface determines that there is a trigger for a trim buffer write, process 500 may move to step 510.

At step 510, the NVM interface can write trim tokens associated with all trim commands stored in the trim buffer to the NVM. For example, upon detecting a flush command or a context save, the NVM interface can write the trim tokens prior to processing the flush command or the context save. As another example, upon detecting that the indirection system's memory usage is above the pre-determined threshold, the NVM interface can write the trim tokens when the trim buffer is only partially full (e.g., 10% full or only has a few entries). In some cases, the NVM interface can wait to write the trim tokens until the number of trim commands stored in the trim buffer reaches a pre-determined threshold. After writing the trim tokens, process 500 may end at step 512.

In other embodiments, instead of writing the trim tokens to the NVM upon detecting a context save, the NVM interface can ignore the trim commands stored in the trim buffer, and process the context save instead. This can allow the context save to handle the pending trim commands. Because the context save can create a time-domain event sequence for device boot-up that matches the event sequence during runtime, the same indirection system can be rebuilt at device boot-up. Moreover, in this embodiment, the device can avoid duplicating the handling of trim commands. However, although trim tokens are no longer written to the NVM, the associated trim commands can still be applied to the indirection system prior to the context save.

As discussed above, because trim tokens may be written to the NVM when the trim buffer is only partially full, the trim buffer may include at least one marker indicating the number of trim commands that are stored in the trim buffer. The at least one marker can be written to one or more pages of the NVM along with the trim tokens. Upon device boot-up, the NVM interface can use the at least one marker to determine the number of valid entries to read from the one or more pages.

Figure 6A:
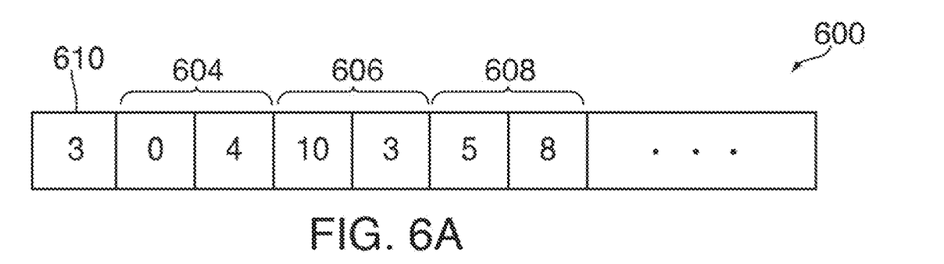
FIGS. 6A and 6B are graphical views of trim buffers in accordance with various embodiments of the invention.
Figure 6B:
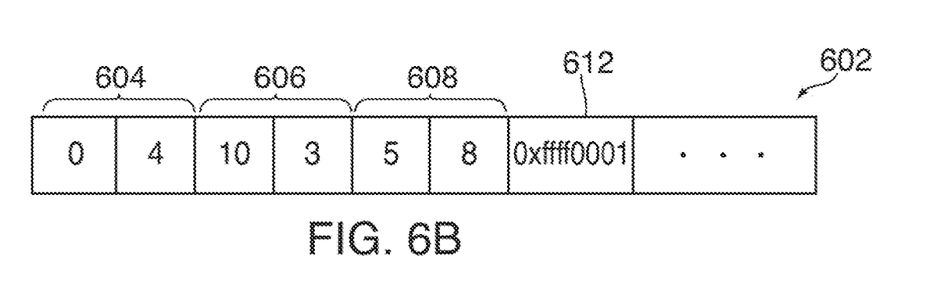

For example, referring now to FIGS. 6A and 6B, graphical views of illustrative trim buffers are shown. As shown in FIGS. 6A and 6B, trim commands are stored as LBA ranges in trim buffers 600 and 602, respectively. In particular, the LBA ranges correspond to LBA start value-LBA end value pairs 604, 606, and 608. Persons skilled in the art will appreciate that, in some embodiments, LBA ranges of a trim buffer can correspond to LBA start value-count pairs.

Trim buffer 600 of FIG. 6A can include entry 610 for storing a count of the number of trim commands (e.g., three trim commands) that are saved in trim buffer 600. Thus, entry 610 is not associated with a particular trim command, but rather may allow an NVM interface (e.g., NVM interface 118 of FIG. 1 or NVM interface 218 of FIG. 2) to determine how many entries of trim buffer 600 are valid entries. As shown, entry 610 can be the first entry of trim buffer 600.

As shown in FIG. 6B, trim buffer 602 can start with entries that correspond to actual trim commands (e.g., LBA start value-LBA end value pairs 604, 606, and 608). However, following those entries, trim buffer 602 can include entry 612 that includes a terminal value. The terminal value can be set to a pre-determined value (e.g., 0xffff0001) indicating an end point for the trim commands. That is, the terminal value can indicate that there are no more valid entries after entry 612, and the NVM interface can consequently ignore any entries following entry 612. Persons skilled in the art will appreciate that instead of or in addition to a count or a terminal value, any suitable list termination method can be used as a marker.

Referring back to FIG. 5, path 2 of process 500 may execute each time that a write command is received from the file system. In particular, path 2 may start at step 516, where the NVM interface can receive a write command from the file system. At step 518, the NVM interface can determine whether the write command overlaps with at least one trim command of the trim buffer (e.g., whether one or more LBAs of the write command overlaps with LBA ranges of the at least one trim commands). Persons skilled in the art will appreciate that because the write command may overlap with more than one trim command of the trim buffer, the NVM interface may need to process overlaps for each trim command of the trim buffer.

If, at step 518, the NVM interface determines that the write command does not overlap with at least one trim command of the trim buffer, process 500 may move to step 520. At step 520, the NVM interface can process the write command. For example, the NVM interface can program user data associated with the write command to the NVM.

Referring back to step 518, if the NVM interface instead determines that the write command overlaps with at least one trim command of the trim buffer, process 500 may move to sub-process 530. As shown in FIG. 5, sub-process 530 can include option 1 and option 2. The NVM interface may execute either option in order to avoid a data loss scenario. In particular, in a data loss scenario, the NVM interface may first program user data associated with the write command. Then, at a later time, the NVM interface may apply a trim command of the trim buffer having at least one LBA that overlaps with the write command. Data loss results because the previously programmed user data inadvertently becomes unmapped in the NVM.

Under option 1, sub-process 530 may begin at step 532, where the NVM interface can write a trim token associated with the at least one trim command to the NVM. In addition, as discussed in step 510, the NVM interface can atomically apply the at least one trim command to the indirection system. Process 500 may then move to step 520.

At step 520, the NVM interface can process the write command. Hence, by pushing the trim token to the NVM before processing the write command, a strict ordering of the trim command path can be provided, and data loss can be prevented. Thus, during device boot-up, the trim token stored on the NVM can be processed before stored user data associated with the write command.

Alternatively, under option 2, instead of pushing the trim token to the NVM, the NVM interface can ignore the overlapping LBAs in the at least one trim command. This is because it may be unnecessary and wasteful to trim overlapping LBAs when the same LBAs are later programmed as part of a write command. Instead, in response to determining that the write command overlaps with the at least one trim command of the trim buffer, the NVM interface can resolve the overlap by removing the overlap from the trim buffer. Particularly in situations where the file system repeatedly trims a particular LBA region and then re-writes to the same LBA region, option 2 allows the NVM interface to avoid writing trim tokens to the NVM when the tokens will not be used again by the device.

Thus, sub-process 530 may begin at step 536, where the NVM interface can remove the write command overlap from the at least one trim command of the trim buffer. In particular, the NVM interface can remove overlapping LBA regions from one or more entries of the trim buffer that are associated with the at least one trim command. Consequently, the non-overlapping LBA regions of the at least one trim command can be preserved.

Several different overlapping scenarios may occur. For example, turning now to FIG. 7, a graphical view of illustrative overlapping scenarios 702-708 are shown.

Figure 7:
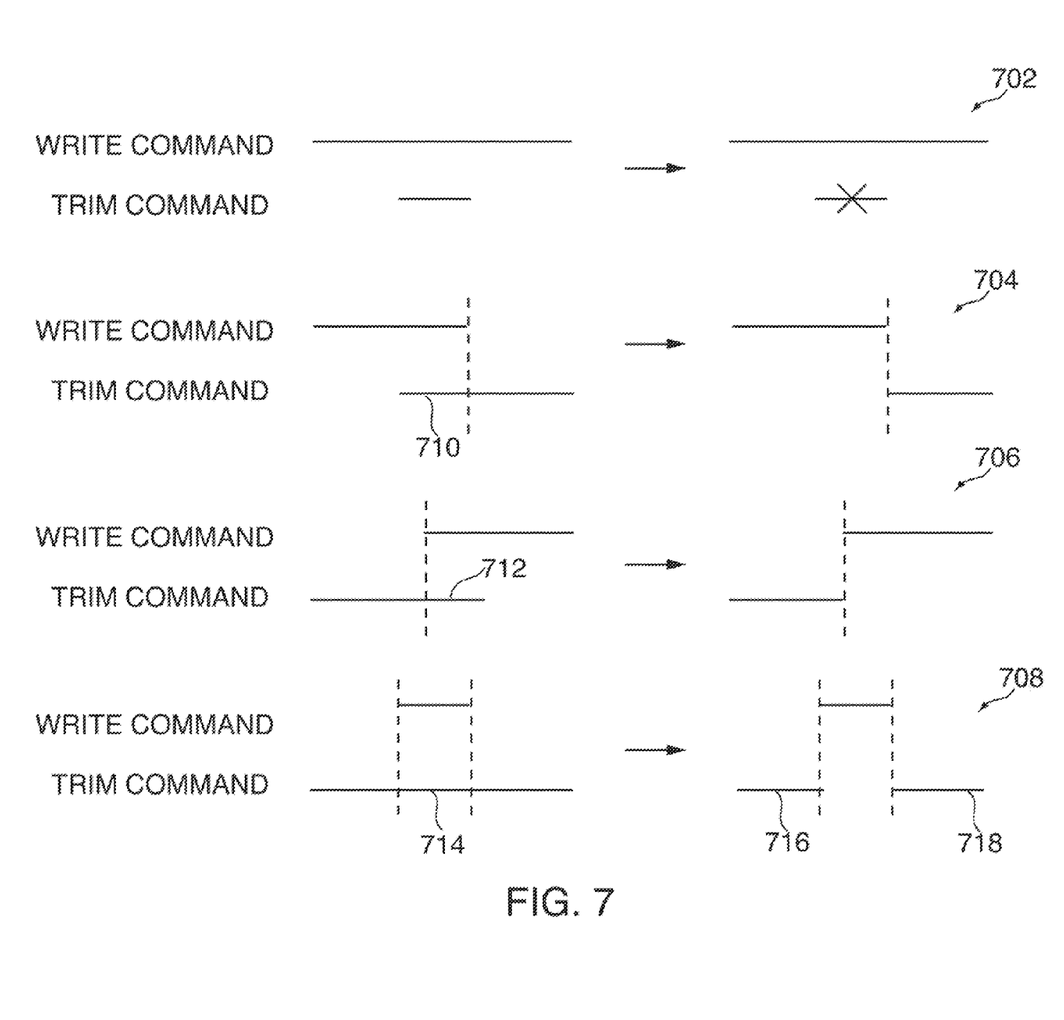
FIG. 7 is a graphical view of illustrative overlapping scenarios in accordance with various embodiments of the invention.

In overlapping scenario 702, a write command may encompass a trim command. In response to detecting this overlap, an NVM interface (e.g., NVM interface 118 of FIG. 1 or NVM 218 of FIG. 2) can discard the trim command from the trim buffer (as indicated by the crossed-out line in overlapping scenario 702). In overlapping scenario 704, if the write command overlaps with left-side portion 710 of the trim command, left-side portion 710 can be removed from the trim command. For example, a LBA start value of the trim command can be updated to a new value that no longer overlaps with the write command.

In overlapping scenario 706, if the write command overlaps with right-side portion 712 of the trim command, right-side portion 712 can be removed from the trim command. For example, a LBA end value of the trim command can be updated to a new value that no longer overlaps with the write command. As another example, a count of the trim command can be reduced to reflect the new range of the trim command.

In overlapping scenario 708, the write command may overlap with middle portion 714 of the trim command. For example, the write command may be associated with LBAs 3 and 4, while the trim command may be associated with LBAs 0-10. In response to detecting this overlap, middle portion 714 can be removed from the trim command. This, however, may cause the original trim command to grow into two trim commands (e.g., trim commands 716 and 718). For instance, trim command 716 can be associated with LBAs 0-3, and trim command 718 can be associated with LBAs 5-10.

Referring back to FIG. 5, once the NVM interface has removed the overlapping LBA regions, sub-process 500 may move to step 538. At step 538, the NVM interface can determine whether the trim buffer is full.

If, at step 538, the NVM interface determines that the trim buffer is not full, sub-process 530 may move to step 520. That is, the resolution of the overlap may have resulted in a net-zero or net-negative footprint (e.g., as in overlapping scenarios 702-706 of FIG. 7). At step 520, the write command can be processed.

Referring back to step 538, if the NVM interface instead determines that the trim buffer is full, sub-process 530 may move to step 540. Thus, the resolution of the overlap may have resulted in a net-positive footprint (e.g., as in overlapping scenario 708 of FIG. 7). These additional trim commands may increase the number of valid entries that are stored in the trim buffer.

At step 540, the NVM interface can write trim tokens associated with all trim commands stored in the trim buffer to the NVM. Sub-process 530 may then return to step 520, where the NVM interface can process the write command.

Figure 8A:
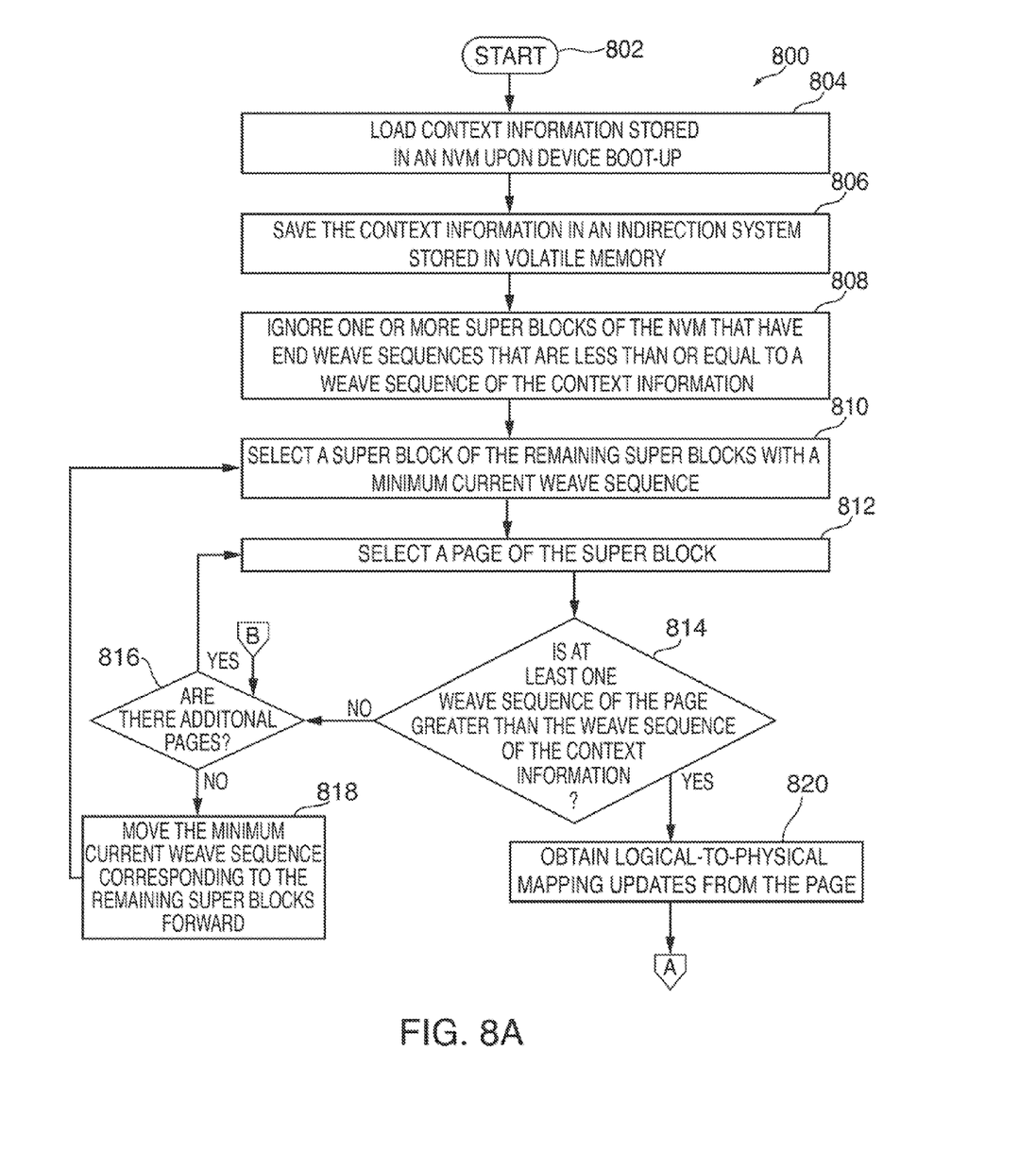
FIGS. 8A and 8B are flowcharts of an illustrative process for boot-time handling of trim tokens stored in a non-volatile memory in accordance with various embodiments of the invention.
Figure 8B:
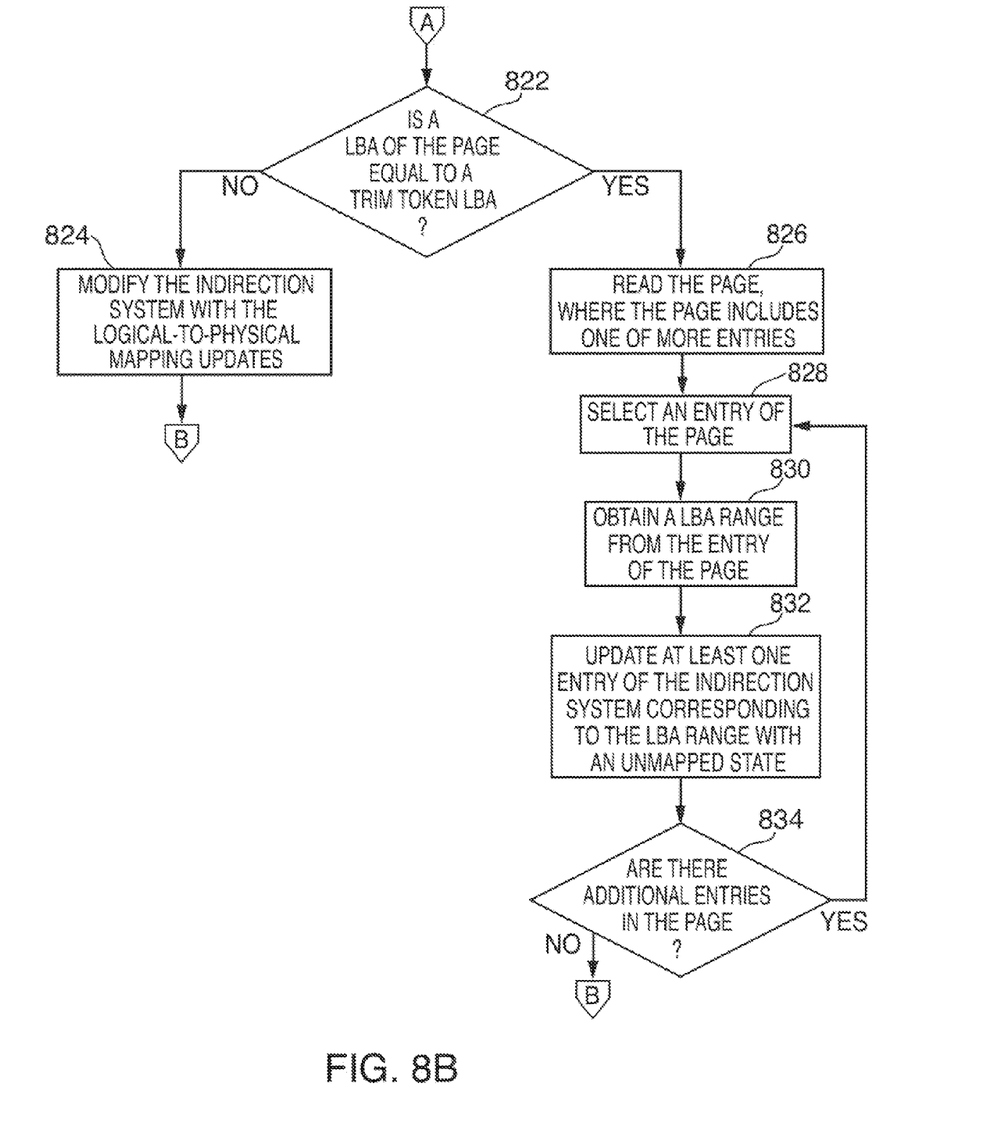

FIGS. 8A and 8B show flowcharts of an illustrative process 800 for boot-time handling of trim tokens stored in an NVM (e.g., NVM 120 of FIG. 1 or NVM 220 of FIG. 2). In some embodiments, the trim tokens may be written to the NVM based on trim commands that were stored in a trim buffer in volatile memory (e.g., memory 114 of FIG. 1). Persons skilled in the art will appreciate that process 800 may include one or more additional steps that are omitted for the sake of simplicity.

Process 800 may begin at step 802, and at step 804, an NVM interface (e.g., NVM interface 118 of FIG. 1 or NVM interface 218 of FIG. 2) can load context information stored in the NVM (e.g., a first super block of the NVM) upon device boot-up. Then, at step 806, the NVM interface can save the context information in an indirection system (e.g., indirection system 116 of FIG. 1) stored in volatile memory (e.g., memory 114 of FIG. 1).

Continuing to step 808, the NVM interface can ignore one or more super blocks of the NVM that have end weave sequences (e.g., maximum weave sequences) that are less than or equal to a weave sequence of the context information. For example, the NVM interface can examine a block TOC of a super block to obtain an end weave sequence of the super block. The one or more super blocks can include super blocks that have been updated before or at the same time as the context save.

At step 810, the NVM interface can select a super block of the remaining super blocks with a minimum current weave sequence (e.g., a lowest end weave sequence). Process 800 may then move to step 812, where the NVM interface can determine whether to replay across the super block.

At step 812, the NVM interface can select a page of the super block (e.g., a first unexamined page of the super block). Continuing to step 814, the NVM interface can determine whether at least one weave sequence of the page is greater than the weave sequence of the context information.

If, at step 814, the NVM interface determines that at least one weave sequence of the page is not greater than the weave sequence of the context information, process 800 may move to step 816. That is, the NVM interface may have determined that user data stored in the page is older than the context information, and the NVM interface can therefore ignore the page.

At step 816, the NVM interface can determine whether there are additional pages in the super block. If, at step 816, the NVM interface determines that there are additional pages, process 800 may return to step 812, where another page (e.g., another unexamined page) of the super block can be selected. If, at step 816, the NVM interface instead determines that there are no additional pages in the super block, process 800 can move to step 818.

At step 818, the NVM interface can move the minimum current weave sequence corresponding to the remaining super blocks forward. Process 800 may then return to step 810, where a super block of the remaining super blocks having the next lowest end weave sequence can be selected.

Referring back to step 814, if the NVM interface instead determines that at least one weave sequence of the page is greater than the weave sequence of the context information, process 800 can move to step 820. That is, the NVM interface can determine to replay across the page. At step 820, the NVM interface can obtain logical-to-physical mapping updates from the page.

Then, at step 822, the NVM interface can determine whether a LBA of the page is equal to a trim token LBA (e.g., a token value such as 0xffff0001). If, at step 822, the NVM interface determines that the LBA of the page is not equal to a trim token LBA, process 800 may move to step 824.

At step 824, the NVM interface can modify the indirection system with the logical-to-physical mapping updates. Process 800 may then return to step 816, where the NVM interface can determine whether there are additional pages in the super block.

Referring back to step 822, if the NVM interface instead determines that the LBA of the page is equal to a trim token LBA, process 800 may move to step 826. That is, instead of applying the logical-to-physical mapping updates of the page to the indirection system, the NVM interface can determine that the page includes trim information that need to be processed. Thus, upon obtaining the trim information from the page, the NVM interface can proceed to update the indirection system with the trim information.

At step 826, the NVM interface can read the page, where the page can include one or more entries. In some embodiments, the NVM interface can read the contents of the page into a buffer stored in volatile memory (e.g., memory 114 of FIG. 1). In addition, in some cases, the NVM interface can read only a portion of the page (e.g., a sub-page). In particular, based on at least one marker stored on the page, the NVM interface can determine the number of trim commands (e.g., the number of entries) to read from the page. The at least one marker can correspond, for example, to a count of the number of trim commands stored on the page (e.g., similar to the value stored in entry 610 of trim buffer 600 of FIG. 6A) or a terminal value stored on the page (e.g., similar to the value stored in entry 612 of trim buffer 602 of FIG. 6B).

Continuing to step 828, the NVM interface can select an entry of the page (e.g., a corresponding entry of the buffer in the volatile memory). Then, at step 830, the NVM interface can obtain a LBA range from the entry of the page. For example, the NVM interface can read a LBA start value and a LBA end value from the buffer entry. As another example, the NVM interface can read a LBA start value and a count from the buffer entry.

At step 832, the NVM interface can update at least one entry of the indirection system corresponding to the LBA range with an unmapped state. The at least one entry of the indirection system can include a LBA range that matches the LBA range obtained from the entry of the page. In some embodiments, the NVM interface can call a tree update function with the LBA range and a trim value. Process 800 may then move to step 834.

At step 834, the NVM interface can determine whether there are additional entries in the page. If, at step 834, the NVM interface determines that there are additional entries in the page, process 800 may return to step 828. That is, the NVM interface can iterate over the one or more entries of the page, and apply corresponding trim commands to one or more portions of the indirection system. At step 828, the NVM interface can select another entry of the page (e.g., advance a pointer in the buffer to a new buffer entry).

Referring back to step 834, if the NVM interface instead determines that there are no additional entries in the page, process 800 may return to step 816, where the NVM interface can determine whether there are additional pages in the super block.

It should be understood that processes 400, 500, and 800 of FIGS. 4, 5, and 8A-8B are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A system comprising:
   a file system;
   a non-volatile memory ("NVM");
   volatile memory comprising a trim buffer;
   a bus controller operative to communicate with the NVM; and
   control circuitry operative to:
      receive a trim command from the file system;
      insert the trim command into the trim buffer;
      determine whether the trim buffer is full; and
      in response to determining that the trim buffer is full, write trim tokens associated with all trim commands stored in the trim buffer to the NVM, wherein the trim buffer comprises at least one of a count of the number of all trim commands stored in the trim buffer and a terminal value that indicates an end point for all trim commands stored in the trim buffer.

2. The system of claim 1, wherein in response to determining that the trim buffer is not full, the control circuitry is operative to:
   detect at least one of a flush command and a context save; and
   write the trim tokens associated with all trim commands stored in the trim buffer to the NVM prior to processing the at least one of the flush command and the context save.

3. The system of claim 2, wherein the volatile memory comprises an indirection system, and the control circuitry is operative to:
   detect that the indirection system's memory usage is above a pre-determined threshold; and
   write the trim tokens associated with all trim commands stored in the trim buffer to the NVM.

4. The system of claim 1, wherein the control circuitry is further operative to receive a write command from the file system.

5. The system of claim 4, wherein the control circuitry is further operative to:
   determine whether the write command overlaps with at least one trim command of the trim buffer; and
   in response to determining that the write command does not overlap with at least one trim command of the trim buffer, process the write command.

6. The system of claim 5, wherein the control circuitry is further operative to program user data associated with the write command to the NVM.

7. The system of claim 5, wherein in response to determining that the write command overlaps with at least one trim command of the trim buffer, the control circuitry is operative to write a trim token associated with the at least one trim command to the NVM.

8. The system of claim 5, wherein in response to determining that the write command overlaps with the at least one trim command of the trim buffer, the control circuitry is operative to:
   remove the write command overlap from the at least one trim command of the trim buffer; and
   determine whether the trim buffer is full.

9. The system of claim 8, wherein in response to determining that the trim buffer is full, the control circuitry is operative to:
   write the trim tokens associated with all trim commands stored in the trim buffer to the NVM; and
   process the write command.

10. The system of claim 8, wherein in response to determining that the trim buffer is not full, the control circuitry is operative to process the write command.

11. A memory interface for accessing a non-volatile memory ("NVM") comprising a plurality of super blocks, the memory interface comprising:
    a bus controller operative to communicate with the NVM; and
    control circuitry operative to:
       load context information stored in a first super block of the NVM upon device boot-up;
       save the context information in an indirection system stored in volatile memory;
       determine to replay across a page of a second super block;
       obtain logical-to-physical mapping updates from the page;
       determine whether a logical block address ("LBA") of the page is equal to a trim token LBA; and
       in response to determining that the LBA of the page is equal to the trim token LBA, update the indirection system with trim information obtained from the page.

12. The memory interface of claim 11, wherein in response to determining that the LBA of the page is not equal to the trim token LBA, modify the indirection system with the logical-to-physical mapping updates.

13. The memory interface of claim 11, wherein the control circuitry is operative to:
    read the page, wherein the page comprises a plurality of entries;
    for each entry of the plurality of entries, obtain a LBA range from the entry; and
    update at least one entry of the indirection system corresponding to the LBA range with an unmapped state.

14. The memory interface of claim 13, wherein the LBA range comprises a LBA start value and a LBA end value.

15. The memory interface of claim 13, wherein the LBA range comprises a LBA start value and a count.

* * * * *